United States Patent [19]
Kliman et al.

[11] Patent Number: 6,012,217
[45] Date of Patent: Jan. 11, 2000

[54] METHOD OF FABRICATION OF MOTOR COIL STATOR INCLUDING BOBBIN WOUND COILS

[75] Inventors: Gerald Burt Kliman, Schenectady; Mark Alan Preston, Niskayuna; Chester Stanley Jezierski, Jr., Amsterdam; Donald Wayne Jones, Burnt Hills, all of N.Y.

[73] Assignee: General Electric Company, Schenectady, N.Y.

[21] Appl. No.: 08/818,847

[22] Filed: Mar. 17, 1997

Related U.S. Application Data

[62] Division of application No. 08/698,822, Aug. 16, 1996, Pat. No. 5,659,218, which is a continuation of application No. 08/254,838, Jun. 6, 1994, abandoned.

[51] Int. Cl.[7] .................................................. H02K 15/04
[52] U.S. Cl. .............................. 29/596; 29/609; 310/42; 310/216; 310/259
[58] Field of Search ........................... 29/596, 598, 609; 310/49 R, 259, 254, 257, 216, 42, 162–165

[56] References Cited

U.S. PATENT DOCUMENTS

| | | |
|---|---|---|
| 3,387,361 | 6/1968 | Rowland et al. .......................... 29/596 |
| 3,694,903 | 10/1972 | Deming ...................................... 29/596 |
| 4,429,241 | 1/1984 | Ohara et al. .............................. 310/51 |
| 4,455,499 | 6/1984 | Sudler .................................... 310/49 R |
| 4,546,278 | 10/1985 | Xuan ........................................ 310/162 |
| 4,818,911 | 4/1989 | Taguchi ................................... 310/259 |
| 5,321,330 | 6/1994 | Tagezout ................................. 310/257 |
| 5,402,028 | 3/1995 | Koeber .................................... 310/259 |

*Primary Examiner*—Carl E. Hall
*Attorney, Agent, or Firm*—Ann M. Agosti; Jill M. Breedlove

[57] ABSTRACT

A motor stator comprises a first stator frame part, a second stator frame part including first and second pole portions separated by a stator bridge, and two magnetic arms. Each of two bobbins is wound with a coil and situated on a respective one of the arms. The first and second stator frame parts are coupled by the arms so as to leave an opening between the two bobbins and the first and second frame parts for insertion of a rotor.

5 Claims, 4 Drawing Sheets

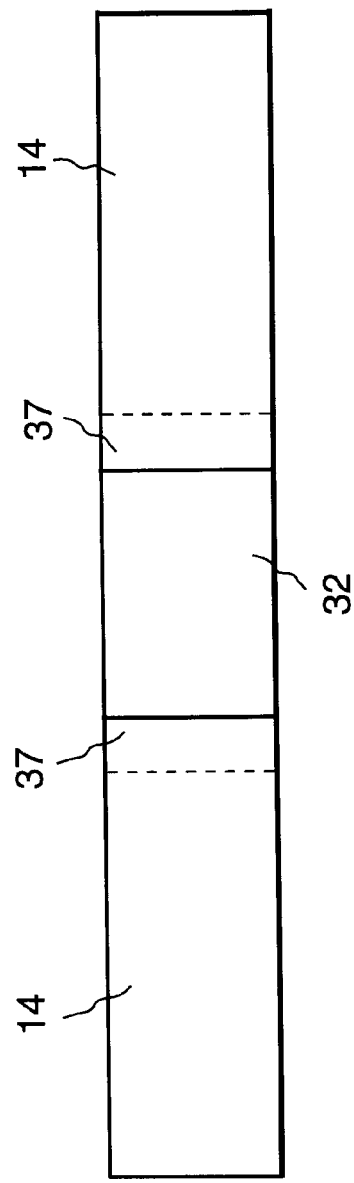
FIG. 4
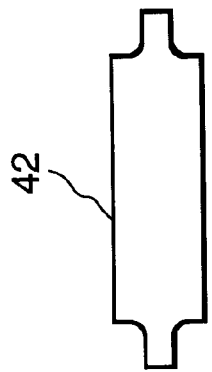
FIG. 6
FIG. 5

METHOD OF FABRICATION OF MOTOR COIL STATOR INCLUDING BOBBIN WOUND COILS

This application is a division, of, Ser. No. 08/698,822, filed Aug. 16, 1996, Kiliman et al. U.S. Pat. No. 5,659,218, issued Aug. 19, 1997, which is a file wrapper continuation of Application No. 08/254,838, filed Jun. 6, 1994, now abandoned.

BACKGROUND OF THE INVENTION

1. Field of the Invention

This invention relates generally to motor stators and, more particularly, to bobbin wound coils arranged in a three-legged magnetic circuit to approximate the operation of a two phase stator.

2. Description of the Related Art

Recent government regulations for household appliances require that small motors be capable of operating with reduced energy consumption. Conventional low power (about 2 watts) motors that have been made in the form of a "C" core shaded pole induction motor to minimize costs have efficiencies that are typically only about 25%. A more expensive conventional low power motor that typically has an efficiency between 60% and 70% is a single phase "C" core ECM (electronically commutated motor) with two switches, a single chip controller, and a coupling capacitor.

The obtainable magnetic flux of conventional low cost single phase motors is lower than desirable and results in a very low volts-per-turn in the stator winding which requires stators to be wound with thousands of turns of very fine wires. These windings generally require expensive specialized machinery.

SUMMARY OF THE INVENTION

Accordingly, one object of the present invention is to provide a simpler stator fabrication process which reduces fabrication time and the need for expensive machinery and results in a more reliable and energy-efficient stator for single phase induction motors and line start permanent magnet motors.

Briefly, in accordance with an embodiment of the invention, a motor stator comprises a first stator frame part, a second stator frame part including first and second pole portions separated by a stator bridge, and two magnetic arms. Each of two bobbins is wound with a coil and situated on a respective one of the arms. The first and second stator frame parts are coupled by the arms so as to leave an opening between the two bobbins and the first and second frame parts for insertion of a rotor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 4 is a top view of the stator shown in FIG. 3; and

FIGS. 5 and 6 are side views of alternative non-magnetic stator bridge geometries.

DETAILED DESCRIPTION OF PREFERRED EMBODIMENTS OF THE INVENTION

Figure 1:
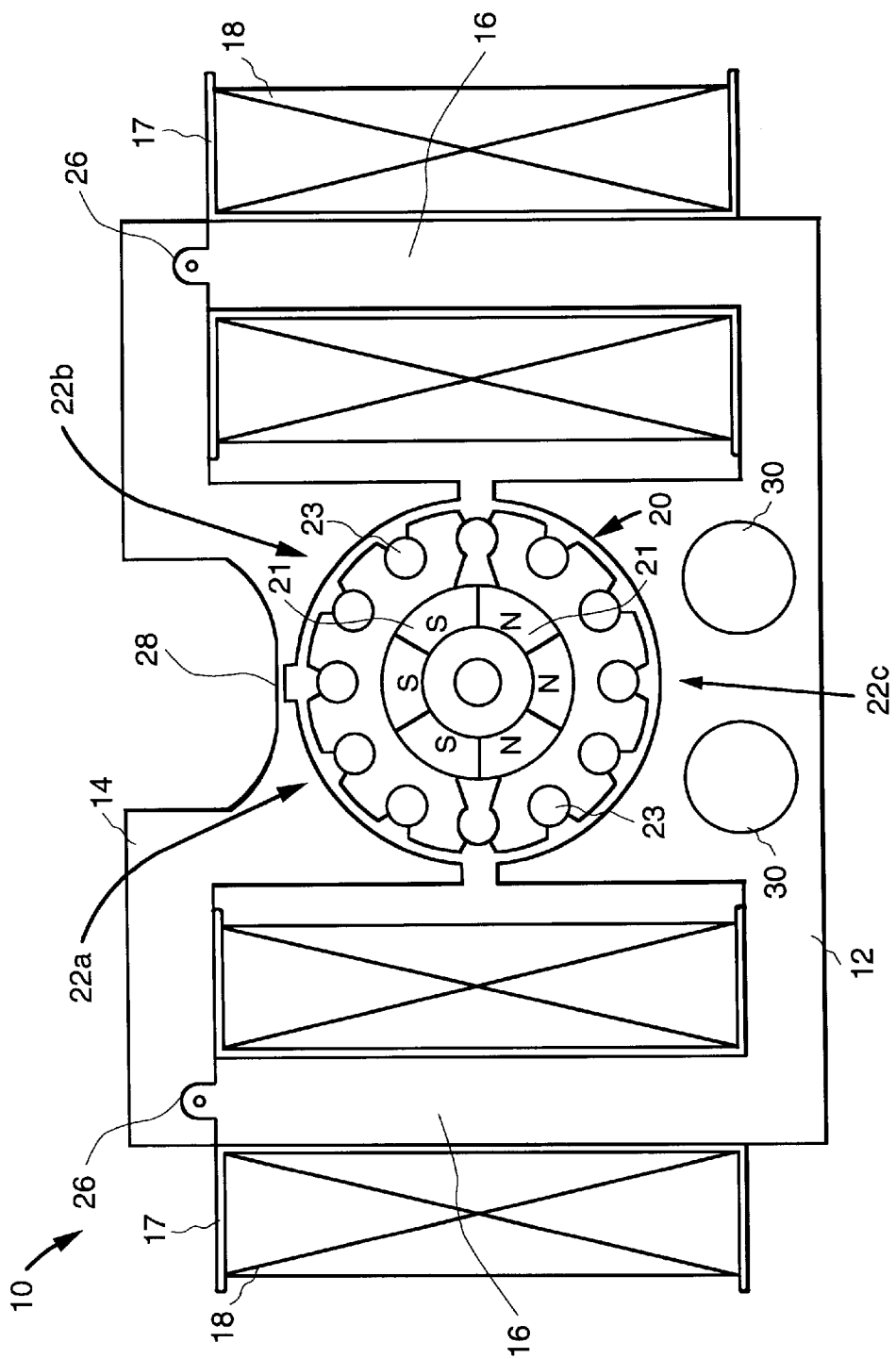
FIG. 1 is a sectional view of one stator embodiment of the present invention.

FIG. 1 is a sectional view of one stator embodiment of the present invention. A stator 10 includes a two piece stator frame including a first frame part 12 and a second frame part 14. The stator frame parts typically comprise several dozen laminations of magnetic sheets such as iron or steel. One of the first and second frame parts (in this embodiment first frame part 12) includes arms 16 for supporting bobbins 17 wound with stator coils 18. Either the same or a different one of the first and second frame parts (in this embodiment second frame part 14) includes a saturated stator bridge 28 which is an integral section of the stator frame extending between and separating first and second pole portions 22a and 22b, respectively.

This configuration results in three magnetic poles: first pole portion 22a, second pole portion 22b, and a single return pole 22c. Effectively there are four magnetic poles because the single return pole functions as two poles. These four poles can be utilized to either realize a single phase capacitor motor, for example, or a two phase motor. In one embodiment, the single return pole is slotted with holes 30 to improve magnetic effectiveness.

Each bobbin can be wound with a coil at high speeds on a separate machine and then inserted on the arms. The bobbins may comprise a non-conductive material such as plastic, and the coils may comprise a metal such as copper or aluminum with enamel insulation, for example. The stator is completed by joining the stator frame parts at connection points 26 in any conventional manner. A rotor 20 including, for example, magnets 21 and a rotor cage 23, can then be inserted in stator 10.

Finite element calculations were performed to estimate the expected flux pattern for a selected point in time for two phase excitation. The analysis suggests the presence of an acceptable amount of flux distortion, and the general pattern of the expected flux creates the desired two pole, two phase configuration.

Figure 2:
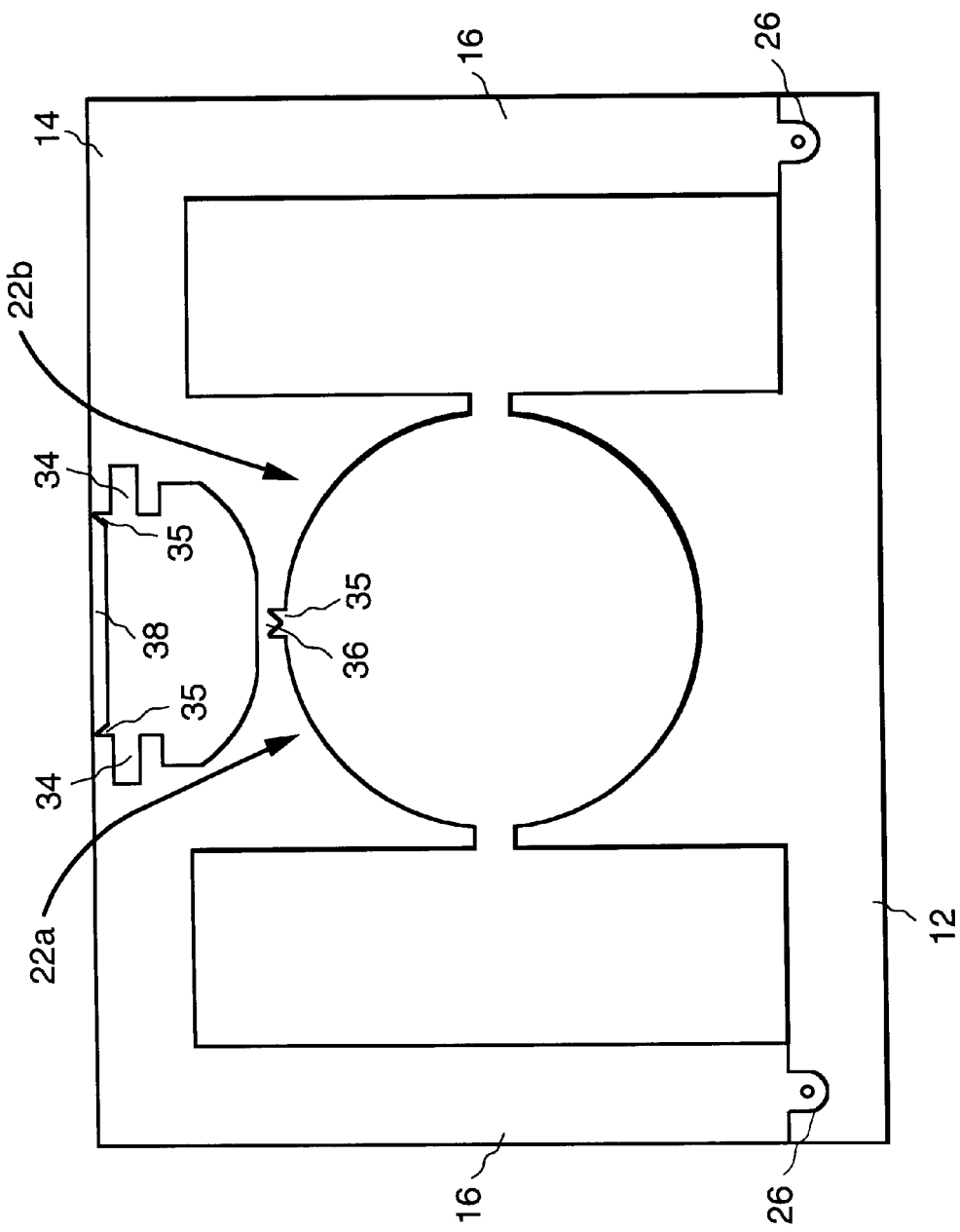
FIG. 2 is a sectional view of stator laminations during a fabrication step of another embodiment.

FIG. 2 is a sectional view of stator laminations during an intermediate fabrication step in another embodiment. Bobbins 17, coils 18, and rotor 20 are present but not shown in FIGS. 2 and 3. The arms extend from second frame part 14 in this embodiment to illustrate of the fact that yoke arms 16 can extend from either of the frame parts 12 and 14. Whether arms 16 are attached to the first or second frame part is a matter of design choice.

In another embodiment of the invention, the arms can be separate pieces which are not integral extensions of either stator frame part. These arms, which must comprise magnetic material can be connected to each of the stator frame parts to couple the two stator frame parts.

To build a motor of the present invention, first and second pole portions 22a and 22b, respectively, must be physically supported so that the stator is mechanically strong enough to resist forces caused by magnetic fields in the motor and by the weight of the motor's parts. The saturated stator bridge used in FIGS. 1 and 2 results in a somewhat fragile stator lamination and an undesirable flux leakage path through the saturated stator bridge.

In the embodiment shown in FIG. 2, the piece of the stator frame, shown here as second part 14, which contains the first and second pole portions, includes knock out alignment strips 36 and 38. These alignment strips are shaped with notches 35 to be easily knocked out after the stator is assembled, but to hold the lamination in stiff alignment during assembly. The number and positions of the alignment strips in FIG. 2 are for example only. A single alignment strip may be used, or more than two may be used, depending on the stator frame design.

Figure 3:
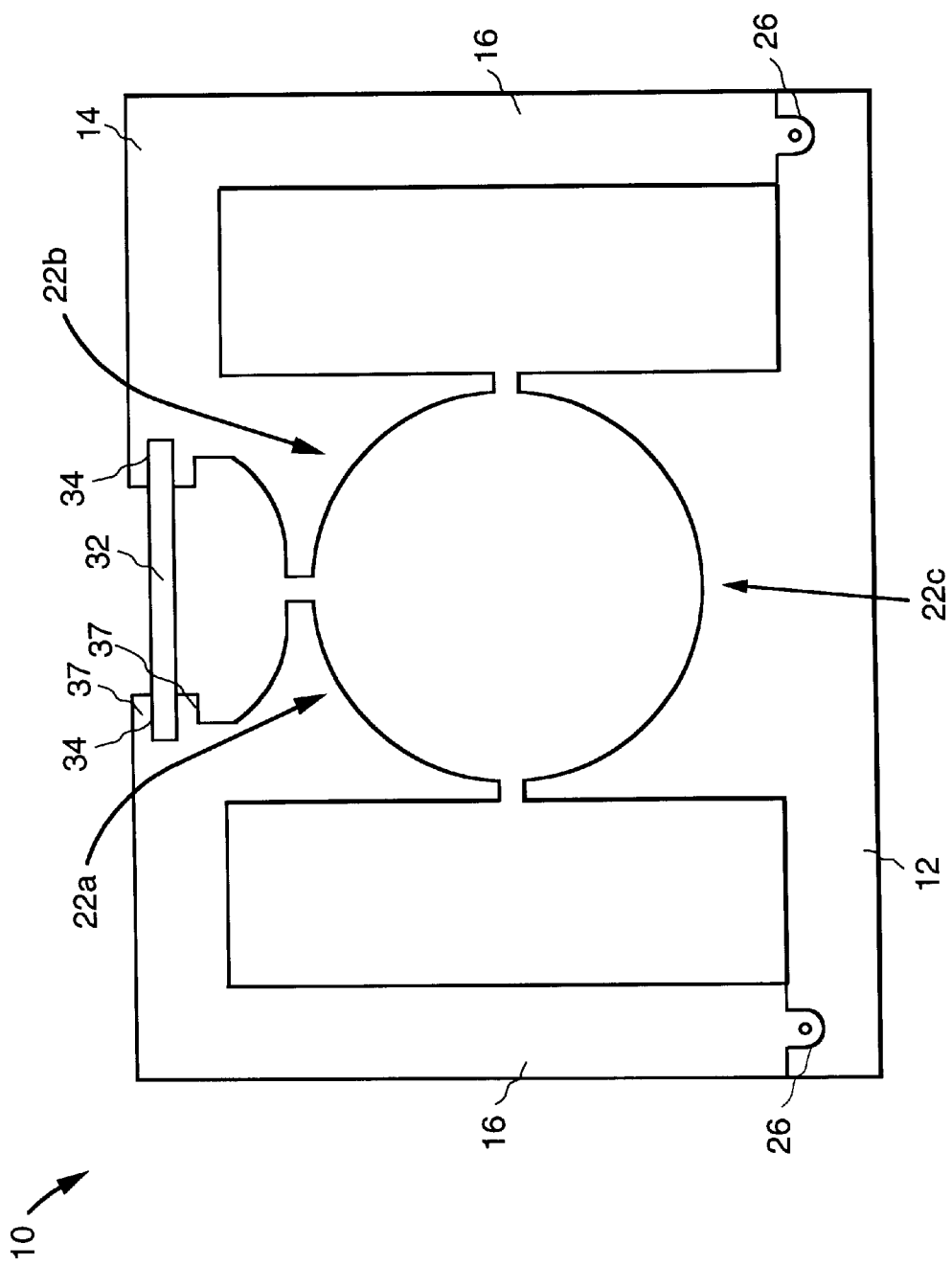
FIG. 3 is a view similar to that of FIG. 2, further showing a non-magnetic stator bridge.

FIG. 3 is a view similar to that of FIG. 2, further showing a non-magnetic stator bridge 32, which, like saturated stator bridge 28 has the mechanical function of holding separate the first and second pole portions 22a and 22b, respectively. Non-magnetic stator bridge 32 is superior in mechanical strength to saturated stator bridge 28 of FIGS. 1 and 2 and does not carry leakage flux. The non-magnetic stator bridge comprises a single piece of rigid non-magnetic material which is forced or crimped into slots 34 of the stator laminations. If the non-magnetic stator bridge fit is sufficiently tight, no crimping is required. If the fit is loose, after the non-magnetic stator bridge has been inserted, the fingers 37 around slots 34 that surround the non-magnetic stator bridge ends can be crimped slightly into the non-magnetic stator bridge ends to hold the stator bridge in position. Without the crimp, tight tolerances must be held on the laminations and non-magnetic stator bridge ends, and sufficient force must be used to insert the non-magnetic stator bridge. A crimp allows looser tolerances and less insertion force, but requires the additional step of crimping. An adhesive, such as an epoxy resin, can alternatively be used between the non-magnetic stator bridge and the fingers in place of the step of crimping.

The alignment strips are needed to hold the laminations into alignment only until the non-magnetic stator bridge is in place. After the non-magnetic stator bridge is inserted, force is applied to the alignment strips to remove them. These strips will shear off at their weakest points, which are the high mechanical stress notches 35 deliberately built in to facilitate removal. Thus, the first and second pole portions become discrete pieces of the second stator frame part having the non-magnetic stator bridge between them for mechanical support.

The non-magnetic stator bridge may comprise any non-magnetic material which has suitable strength and stiffness, including, for example, aluminum or stiff insulation material such as layers of glass cloth coated and cured with epoxy. In a preferred embodiment, the non-magnetic stator bridge comprises a softer material than the material of the stator frame parts either to allow stator bridge material to be shaved off as the non-magnetic stator bridge is pressed into slots 34 or to allow a crimped finger to bite into it.

FIG. 4 is a top view of the stator shown in FIG. 3. The non-magnetic stator bridge geometry can be altered to improve strength or cost effectiveness, or to provide clearance for other parts. For example, if more strength is needed than a simple flat strip of aluminum, the non-magnetic stator bridge can have a large cross section which steps down, as shown by a non-magnetic stator bridge 40 in the side view of FIG. 5, or curves down, as shown by a non-magnetic stator bridge 42 in the side view of FIG. 6, to thinner end tongues.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of fabricating a motor stator, comprising the steps of:

providing a first stator frame part;

providing a second stator frame part including first and second pole portions separated by a stator bridge, wherein the stator bridge comprises a non-magnetic material, and the step of providing the second stator frame part including the first and second pole portions separated by the stator bridge comprises:

providing first and second pole portions separated by at least one alignment strip;

situating the stator bridge between the first and second pole portions; and removing the at least one alignment strip so that the first and second pole portions form discrete pieces of the second stator frame part;

providing two magnetic arms extending from one of the first and second stator frame parts;

situating a bobbin wound with an electrically conductive coil on each of the two arms;

coupling the first and second frame parts with the arms so as to leave an opening between the two bobbins and the first and second frame parts for insertion of a rotor.

2. The method of claim 1, further including the step of forming a plurality of fingers defining slots for insertion of the stator bridge, and wherein the step of situating the stator bridge between the first and second pole portions comprises inserting the stator bridge in the slots.

3. The method of claim 2, wherein the stator bridge has a thickness which is substantially the same as a thickness of the slots in the locations where the stator bridge is inserted in the slots, and wherein the step of inserting the stator bridge in the slots comprises forcing the stator bridge in the slots.

4. The method of claim 2, further including the step of crimping the fingers in the direction of the stator bridge.

5. The method of claim 2, further including the step of applying an adhesive material between the stator bridge and the fingers.

* * * * *